(12) United States Patent
Oh et al.

(10) Patent No.: US 12,546,820 B2
(45) Date of Patent: Feb. 10, 2026

(54) TEST MODE CONTROL CIRCUIT, SEMICONDUCTOR APPARATUS AND SYSTEM, AND METHOD THEREOF

(71) Applicant: SK hynix Inc., Gyeonggi-do (KR)

(72) Inventors: Jin Suk Oh, Gyeonggi-do (KR); Young Jae An, Gyeonggi-do (KR); Bok Rim Ko, Gyeonggi-do (KR); Jae Heung Kim, Gyeonggi-do (KR); Min Wook Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 415 days.

(21) Appl. No.: 18/174,647

(22) Filed: Feb. 27, 2023

(65) Prior Publication Data
US 2024/0159828 A1 May 16, 2024

(30) Foreign Application Priority Data
Nov. 14, 2022 (KR) .................. 10-2022-0151648

(51) Int. Cl.
*G01R 31/317* (2006.01)
*G01R 31/3183* (2006.01)

(52) U.S. Cl.
CPC .. *G01R 31/31719* (2013.01); *G01R 31/31701* (2013.01); *G01R 31/3183* (2013.01)

(58) Field of Classification Search
CPC ........ G01R 31/31719; G01R 31/31701; G01R 31/3183
See application file for complete search history.

(56) References Cited

U.S. PATENT DOCUMENTS

2008/0143373 A1* 6/2008 Bonaccio ............ G06F 21/6245
711/E12.1
2017/0131355 A1* 5/2017 Johnson ........... G01R 31/31719

FOREIGN PATENT DOCUMENTS

JP        6656398 B2 *  3/2020  ............. G11C 29/14
KR     10-1035587 B1     5/2011

* cited by examiner

*Primary Examiner* — Frantz B Jean
(74) *Attorney, Agent, or Firm* — IP & T GROUP LLP

(57) ABSTRACT

A test mode control circuit includes an encryption circuit and a test mode generating circuit. The encryption circuit encrypts, based on an encryption code, an access code set to generate an encrypted access code set. The test mode generating circuit generates a test mode signal based on the encrypted access code set.

19 Claims, 6 Drawing Sheets

TEST MODE CONTROL CIRCUIT, SEMICONDUCTOR APPARATUS AND SYSTEM, AND METHOD THEREOF

CROSS-REFERENCES TO RELATED APPLICATION

The present application claims priority under 35 U.S.C. § 119 a to Korean patent application number 10-2022-0151648, filed on Nov. 14, 2022, which is incorporated herein by reference in its entirety as set forth in full.

BACKGROUND

1. Technical Field

Various embodiments of the present disclosure generally relate to an integrated circuit technology, and, more particularly, to a test mode control circuit, and a semiconductor apparatus and a semiconductor system including the same.

2. Related Art

In a course of manufacturing a semiconductor apparatus, various tests may be performed on the semiconductor apparatus to check the reliability of the semiconductor apparatus. Tests on the semiconductor apparatus may be classified into a wafer test, a package test, and a mounting test with reference to the manufacturing process of the semiconductor apparatus. A manufacturer may perform the wafer test and the package test on the semiconductor apparatus while manufacturing the semiconductor apparatus. A buyer may perform the mounting test on the semiconductor apparatus. That is, the manufacturer may test the semiconductor apparatus before shipping the semiconductor apparatus and the buyer may test the semiconductor apparatus after the shipping of the semiconductor apparatus.

The semiconductor apparatus may enter various test modes for testing the reliability thereof. For the buyer to perform the mounting test on the semiconductor apparatus, the manufacturer may provide the buyer with codes related to the various test modes. However, when the codes related to the test modes are provided to the buyer without any protection for the codes, there is a high risk that confidential information of the manufacturer becomes open to public and that the codes related to the test modes become abused.

SUMMARY

In an embodiment of the present disclosure, a test mode control circuit may include a non-volatile memory, an encrypting circuit, and a test mode generating circuit. The non-volatile memory may be configured to store therein an encrypting code. The encrypting circuit may be configured to receive the encrypting code from the non-volatile memory and configured to change, based on the encrypting code, a logic level of each of at least a part of bits included in an access code set to generate a modified access code set when an encryption function is activated. The test mode generating circuit may be configured to generate a plurality of test mode signals based on the modified access code set.

In an embodiment of the present disclosure, a semiconductor system may include an external apparatus and a semiconductor apparatus. The external apparatus may be configured to provide a control signal corresponding to a decrypted access code set. The semiconductor apparatus may be configured to generate a plurality of test mode signals based on the decrypted access code set. The semiconductor apparatus may include an encrypting circuit and a test mode generating circuit. The encrypting circuit may be configured to encrypt the decrypted access code set to generate an encrypted access code set. The test mode generating circuit may be configured to generate the plurality of test mode signals based on the encrypted access code set.

In an embodiment of the present disclosure, an operating method of a semiconductor system may include providing, by an external apparatus, a control signal corresponding to an access code set for test mode entry; entering, by a semiconductor apparatus, a test mode based on the access code set for the test mode entry; providing, by the external apparatus, a control signal corresponding to an access code set for generating a test mode signal; and generating, by the semiconductor apparatus, an encrypted access code set by encrypting the access code set for generating the test mode signal and generating, by the semiconductor apparatus, at least one of a plurality of test mode signals based on the encrypted access code set.

DETAILED DESCRIPTION

Figure 1:
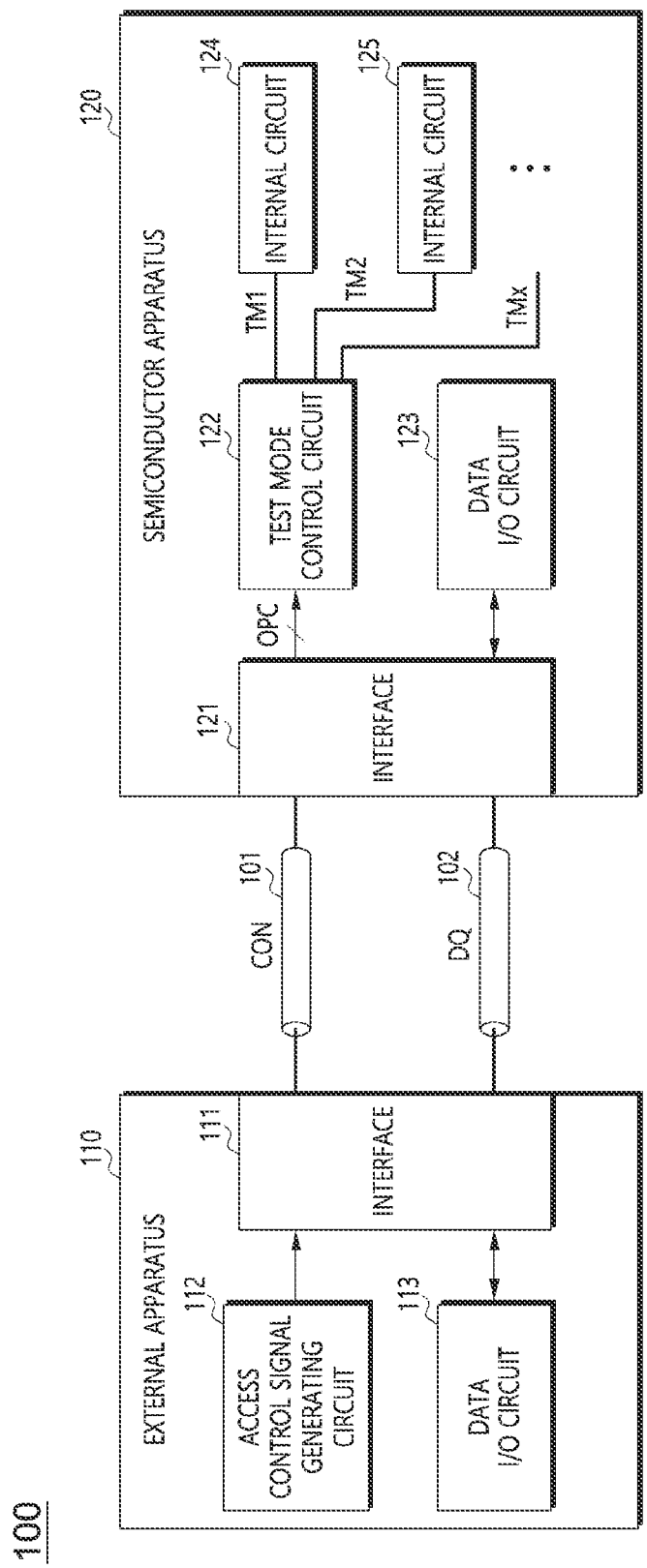
FIG. 1 is a diagram illustrating a configuration of a semiconductor system in accordance with an embodiment of the present disclosure.

FIG. 1 is a diagram illustrating a configuration of a semiconductor system 100 in accordance with an embodiment of the present disclosure. Referring to FIG. 1, the semiconductor system 100 may include an external apparatus 110 and a semiconductor apparatus 120. The external apparatus 110 may perform a data communication with the semiconductor apparatus 120. The external apparatus 110 may provide the semiconductor apparatus 120 with various control signals required for operations of the semiconductor apparatus 120. The external apparatus 110 may be a master device and may include various hosts and/or processor devices. For example, the external apparatus 110 may include a central processing unit (CPU), a graphic processing unit (GPU), a multi-media processor (MMP), a digital signal processor, an application processor (AP), a memory controller and so forth. Also, the external apparatus 110 may be a test device or a test equipment for testing the semiconductor apparatus 120. The semiconductor apparatus 120 may be coupled to the external apparatus 110 to perform a data communication with the external apparatus 110. The semiconductor apparatus 120 may include any slave device or any integrated circuit controlled by the external apparatus 110. For example, the semiconductor apparatus 120 may be a memory device including a volatile memory and a non-volatile memory. The volatile memory may include a static random access memory (static RAM: SRAM), a dynamic RAM (DRAM) and a synchronous DRAM (SDRAM). The non-volatile memory may include a read only memory (ROM), a programmable ROM (PROM), an electrically erasable and programmable ROM (EEPROM), an electrically programmable ROM (EPROM), a flash memory, a phase change RAM (PRAM), a magnetic RAM (MRAM), a resistive RAM (RRAM), a ferroelectric RAM (FRAM) and so forth.

The semiconductor apparatus 120 may be coupled to the external apparatus 110 through a plurality of buses. Each of the plurality of buses may be a signal transmission path, a link or a channel for transferring a signal. The plurality of buses may include a control signal bus 101 and a data bus 102. The control signal bus 101 may be a unidirectional bus from the external apparatus 110 to the semiconductor apparatus 120. The data bus 102 may be a bidirectional bus. The semiconductor apparatus 120 may be coupled to the external apparatus 110 through the control signal bus 101. The semiconductor apparatus 120 may receive, through the control signal bus 101, various control signals CON from the external apparatus 110. For example, the control signals CON may include any control signal for a semiconductor system communication such as a command signal, an address signal, a clock signal, a clock enable signal, a chip selecting signal and so forth. The semiconductor apparatus 120 may be coupled to the external apparatus 110 through the data bus 102. Through the data bus 102, the semiconductor apparatus 120 may receive data DQ from the external apparatus 110 and may provide the data DQ to the external apparatus 110. The semiconductor apparatus 120 may perform a test operation based on the control signals CON provided through the control signal bus 101. After completion of the test operation, the semiconductor apparatus 120 may provide, through the data bus 102, the external apparatus 110 with information or a result related to the test operation.

The external apparatus 110 may include an interface 111, an access control signal generating circuit 112 and a data input/output (I/O) circuit 113. The interface 111 may couple the access control signal generating circuit 112 and the data I/O circuit 113 to the semiconductor apparatus 120 through the control signal bus 101 and the data bus 102, respectively. The interface 111 may provide, through the control signal bus 101, the semiconductor apparatus 120 with the control signals CON from the access control signal generating circuit 112. The interface 111 may provide, through the data bus 102, the semiconductor apparatus 120 with the data DQ from the data I/O circuit 113. The interface 111 may receive, through the data bus 102, the data DQ from the semiconductor apparatus 120 to provide the data DQ to the data I/O circuit 113.

The access control signal generating circuit 112 may generate the control signals CON corresponding to an access code set OPC. In response to a request from a user, the access control signal generating circuit 112 may generate the control signals CON corresponding to the access code set OPC. The access code set OPC may be a signal for the semiconductor apparatus 120 to enter a test mode or may be a signal for the semiconductor apparatus 120 to perform various test operations in a test mode. In order to control the semiconductor apparatus 120 to perform a test operation, the access control signal generating circuit 112 may generate a plurality of control signals CON corresponding to a plurality of access code sets OPC having different logic values. For example, the access control signal generating circuit 112 may generate a command signal and/or an address signal having a logic value corresponding to the access code set OPC. The access code set OPC may be a non-encrypted access code set or a decrypted access code set.

Based on internal data of the external apparatus 110, the data I/O circuit 113 may provide the data DQ to the semiconductor apparatus 120 through the interface 111 and the data bus 102. The data I/O circuit 113 may receive, through the interface 111 and the data bus 102, the data DQ from the semiconductor apparatus 120 to generate internal data of the external apparatus 110. When the access control signal generating circuit 112 provides the semiconductor apparatus 120 with the control signals CON for the semiconductor apparatus 120 to perform a test operation, the data I/O circuit 113 may receive, through the data bus 102, information or a result that the semiconductor apparatus 120 generates based on the test operation.

The semiconductor apparatus 120 may include an interface 121, a test mode control circuit 122, a data I/O circuit 123 and a plurality of internal circuits 124 and 125. The interface 121 may couple the semiconductor apparatus 120 and the external apparatus 110 to each other through the control signal bus 101 and the data bus 102. The interface 121 may receive the control signals CON from the external apparatus 110 through the control signal bus 101. The interface 121 may provide, through the data bus 102, the external apparatus 110 with data DQ from the data I/O circuit 123. The interface 121 may receive, through the data bus 102, data DQ from the external apparatus 110 to provide the received data DQ to the data I/O circuit 123. When receiving, from the external apparatus 110, the control signals CON to control the semiconductor apparatus 120 to perform a test operation, the interface 121 may generate the access code set OPC from the control signals CON.

The test mode control circuit 122 may receive the access code set OPC from the interface 121. The test mode control circuit 122 may generate a plurality of test mode signals TM1, TM2 and TMx based on the access code set OPC. The plurality of test mode signals TM1, TM2 and TMx may be allocated to the plurality of internal circuits 124 and 125 within the semiconductor apparatus 120. The plurality of internal circuits 124 and 125 may perform test operations of different types based on the respectively allocated test mode signals TM1, TM2 and TMx. The test mode control circuit 122 may encrypt the access code set OPC and may generate the plurality of test mode signals TM1, TM2 and TMx based on the encrypted access code set. By encrypting the access code set OPC, the test mode control circuit 122 may modulate the access code set OPC to a code signal appropriate for the generation of the test mode signal TM1, TM2 and TMx.

Based on internal data of the semiconductor apparatus 120, the data I/O circuit 123 may provide the data DQ to the external apparatus 110 through the interface 121 and the data bus 102. The data I/O circuit 123 may receive, through the interface 121 and the data bus 102, the data DQ from the external apparatus 110 to generate internal data of the semiconductor apparatus 120. During a test operation of the semiconductor apparatus 120, the data I/O circuit 123 may receive a signal output from at least one of the plurality of internal circuits 124 and 125 and may output the received signal as the data DQ.

Figure 2:
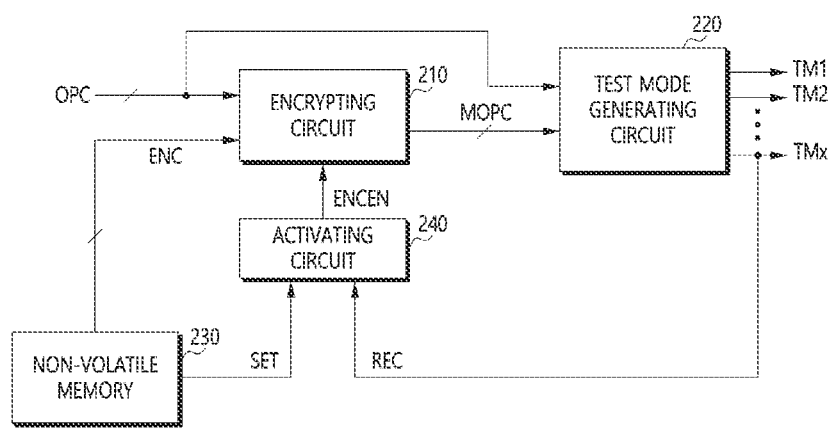
FIG. 2 is a diagram illustrating a configuration of a test mode control circuit in accordance with an embodiment of the present disclosure.

FIG. 2 is a diagram illustrating a configuration of a test mode control circuit 200 in accordance with an embodiment of the present disclosure. The test mode control circuit 200 may be applied as the test mode control circuit 122 illustrated in FIG. 1. Referring to FIG. 2, the test mode control circuit 200 may include an encrypting circuit 210 and a test mode generating circuit 220. The encrypting circuit 210 may receive the access code set OPC and an encrypting code ENC to generate a modified access code set MOPC. Each of the access code set OPC, the encrypting code ENC and the modified access code set MOPC may include a plurality of bits. A number of bits included in the modified access code set MOPC may be the same as a number of bits included in the access code set OPC. A number of bits included in the encrypting code ENC may be the same as or different from the number of bits included in the access code set OPC. The encrypting circuit 210 may encrypt, based on the encrypting code ENC, the access code set OPC to generate an encrypted access code set. The encrypting circuit 210 may change, based on the encrypting code ENC, a logic level of each of at least a part of the bits within the access code set OPC to generate the encrypted access code set having a changed logic value. Through various encryption schemes, the encrypting circuit 210 may generate the encrypted access code set from the access code set OPC. For example, the encrypting circuit 210 may generate the encrypted access code set by changing, based on the encrypting code ENC, a sequence of the bits within the access code set OPC. The encrypting circuit 210 may generate the encrypted access code set by inverting, based on the encrypting code ENC, logic levels of particular bits of the bits within the access code set OPC. Preferably, the encrypting circuit 210 may adopt the encryption scheme to minimize a size of the encrypting code ENC. The encrypting circuit 210 may provide the test mode generating circuit 220 with the encrypted access code set as the modified access code set MOPC. In an embodiment, the encrypting circuit 210 may provide, as the modified access code set MOPC, one of the access code set OPC and the encrypted access code set according to whether an encrypting function of the encrypting circuit 210 is activated or not.

The test mode control circuit 200 may further include a non-volatile memory 230. The non-volatile memory 230 may include a fuse array or an electrical fuse array, which will not limit the type of the non-volatile memory 230. The non-volatile memory 230 may include any memory as far as the memory is a read-only memory or a one-time programmable (OTP) memory. The non-volatile memory 230 may store therein the encrypting code ENC. The encrypting code ENC may be programmed into the non-volatile memory 230 while the semiconductor apparatus 120 is being manufactured or before the semiconductor apparatus 120 is shipped after completion of the manufacturing. The fewer the number of bits within the encrypting code ENC, the better the encrypting code ENC. The less a capacity of the non-volatile memory 230 for storing therein the encrypting code ENC, the better the non-volatile memory 230. As the capacity of the non-volatile memory 230 becomes less, an area of the test mode control circuit 200 may become less and a cost for manufacturing the semiconductor apparatus 120 may become reduced. When the semiconductor apparatus 120 is booted up or powered up, the non-volatile memory 230 may provide the encrypting circuit 210 with the encrypting code ENC.

The test mode generating circuit 220 may receive the modified access code set MOPC from the encrypting circuit 210. The test mode generating circuit 220 may generate the plurality of test mode signals TM1, TM2 and TMx based on the modified access code set MOPC. The test mode generating circuit 220 may determine, based on the modified access code set MOPC, whether to enter a test mode and may generate, based on the modified access code set MOPC, the plurality of test mode signals TM1, TM2 and TMx. For example, the test mode generating circuit 220 may determine to enter the test mode when a plurality of modified access code sets MOPC having particular logic values is provided. The plurality of the modified access codes has different logic values with one another, or a part or all of the plurality of the modified access codes have the same logic value. Based on the modified access code set MOPC provided after the entry to the test mode, the test mode generating circuit 220 may generate the plurality of test mode signals TM1, TM2 and TMx. After the entry to the test mode, the test mode generating circuit 220 may generate the plurality of test mode signals TM1, TM2 and TMx by decoding the at least single modified access code set MOPC. In an embodiment, the test mode generating circuit 220 may receive the access code set OPC together with the modified access code set MOPC. The test mode generating circuit 220 may determine whether to enter the test mode based on at least one of the access code set OPC and the modified access code set MOPC and may generate the plurality of test mode signals TM1, TM2 and TMx based on the modified access code set MOPC.

The encrypting circuit 210 may further receive an encryption enable signal ENCEN. The encrypting circuit 210 may selectively perform an encrypting operation based on the encryption enable signal ENCEN. When the encryption enable signal ENCEN becomes enabled, the encrypting circuit 210 may encrypt the access code set OPC to output the encrypted access code set as the modified access code set MOPC. When the encryption enable signal ENCEN becomes disabled, the encrypting circuit 210 may not encrypt the access code set OPC to output the access code set OPC as the modified access code set MOPC. The test mode control circuit 200 may further include an activating circuit 240. The activating circuit 240 may generate the encryption enable signal ENCEN based on a setting signal SET and a recovery signal REC. The activating circuit 240 may enable the encryption enable signal ENCEN based on the setting signal SET and may disable the encryption enable signal ENCEN based on the recovery signal REC, The non-volatile memory 230 may further store therein a bit corresponding to the setting signal SET. When the semiconductor apparatus 120 is booted up or powered up, the non-volatile memory 230 may provide the setting signal SET to the activating circuit 240.

TABLE 1

| SET | REC | ENCEN |
|-----|-----|---------|
| 0 | 0 | Disable |
| 0 | 1 | Disable |
| 1 | 0 | Enable |
| 1 | 1 | Disable |

As shown in Table 1, the activating circuit 240 may disable the encryption enable signal ENCEN when the bit corresponding to the setting signal SET has a value of '0' and may enable the encryption enable signal ENCEN when the bit corresponding to the setting signal SET has a value of '1'. The recovery signal REC may be one of the plurality of test mode signals TM1, TM2 and TMx. For example, the recovery signal REC may be the x-th test mode signal TMx. The 'x' may be three or a greater integer. The recovery signal REC may disable the encryption enable signal ENCEN that is enabled by the setting signal SET. The activating circuit 240 may keep the encryption enable signal ENCEN enabled when the bit corresponding to the setting signal SET has a value of '1' and the recovery signal REC has a value of '0'. The activating circuit 240 may disable the encryption enable signal ENCEN, which stays enabled, when the recovery signal REC having a value of '1' is provided.

In order to prevent a test mode of the semiconductor apparatus 120 from being open to the buyer, the setting signal SET having a value of '1' may be programmed and the encrypting circuit 210 may basically encrypt the access code set OPC to generate the encrypted access code set. When provided is the access code set OPC for generating the x-th test mode signal TMx corresponding to the recovery signal REC, the activating circuit 240 may disable the encryption enable signal ENCEN for the encrypting circuit 210 not to perform the encrypting operation. Based on the access code set OPC that is not encrypted, the test mode generating circuit 220 may generate the plurality of test mode signals TM1, TM2 and TMx. Therefore, according to whether the encrypting function of the encrypting circuit 210 is activated or not, different test mode signals may be enabled on the basis of the same access code set OPC. For example, the test mode generating circuit 220 may enable the first test mode signal TM1 by decoding the encrypted access code set and may enable the second test mode signal TM2 by decoding the access code set OPC.

Figure 3:
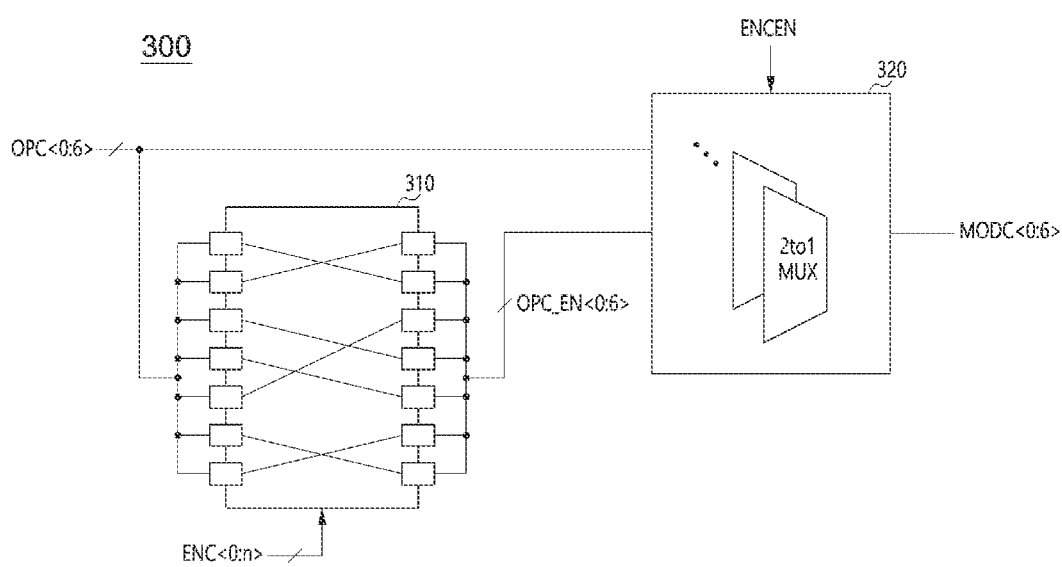
FIG. 3 is a diagram illustrating a configuration of an encrypting circuit in accordance with an embodiment of the present disclosure.

FIG. 3 is a diagram illustrating a configuration of an encrypting circuit 300 in accordance with an embodiment of the present disclosure. The encrypting circuit 300 may be applied as the encrypting circuit 210 illustrated in FIG. 2. Referring to FIG. 3, the encrypting circuit 300 may generate the encrypted access code set OPC_EN<0:6> by changing the sequence of the bits within the access code set OPC<0:6>. Although FIG. 3 illustrates the access code set OPC<0:6> and the encrypted access code set OPC_EN<0:6> each including seven (7) bits, the number of bits included in each of the access code set OPC<0:6> and the encrypted access code set OPCEN<0:6> may vary. The encrypting circuit 300 may include a bit mixing circuit 310 and a bit selecting circuit 320. The bit mixing circuit 320 may receive the access code set OPC<0:6> and the encrypting code ENC<0:n>, 'n' being one or a greater integer. The bit mixing circuit 310 may change the sequence of the bits within the access code set OPC<0:6> based on the encrypting code ENC<0:n>. The bit mixing circuit 310 may change the sequence of the bits within the access code set OPC<0:6> to generate the encrypted access code set OPC_EN<0:6>. For example, based on the encrypting code ENC<0:n>, the bit mixing circuit 310 may provide the first bit OPC<0> of the access code set OPC<0:6> as the second bit OPC_EN<1> of the encrypted access code set OPC_EN<0:6> and may provide the second bit OPC<1> of the access code set OPC<0:6> as the first bit OPCEN<0> of the encrypted access code set OPC_EN<0:6>. Also, the bit mixing circuit 310 may provide the third bit OPC<2> of the access code set OPC<0:6> as the fourth bit OPC_EN<3> of the encrypted access code set OPC_EN<0:6>, may provide the fourth bit OPC<3> of the access code set OPC<0:6> as the fifth bit OPC_EN<4> of the encrypted access code set OPC_EN<0:6> and may provide the fifth bit OPC<4> of the access code set OPC<0:6> as the third bit OPC_EN<2> of the encrypted access code set OPC_EN<0:6>. Further, the bit mixing circuit 310 may provide the sixth bit OPC<5> of the access code set OPC<0:6> as the seventh bit OPC_EN<6> of the encrypted access code set OPC_EN<0:6> and may provide the seventh bit OPC<6> of the access code set OPC<0:6> as the sixth bit OPC_EN<5> of the encrypted access code set OPCEN<0:6>. The sequence and the number of the bits that the bit mixing circuit 310 is to mix may vary based on the encrypting code ENC<0:n>.

The bit selecting circuit 320 may receive the encryption enable signal ENCEN, the access code set OPC<0:6> and the encrypted access code set OPC_EN<0:6>. The bit selecting circuit 320 may output, as the modified access code set MOPC<0:6>, one of the access code set OPC<0:6> and the encrypted access code set OPC_EN<0:6> based on the encryption enable signal ENCEN. When the encryption enable signal ENCEN becomes enabled, the bit selecting circuit 320 may output the encrypted access code set OPC_EN<0:6> as the modified access code set MOPC<0:6>. When the encryption enable signal ENCEN becomes disabled, the bit selecting circuit 320 may output the access code set OPC<0:6> as the modified access code set MOPC<0:6>. The bit selecting circuit 320 may include a plurality of 2 to 1 multiplexers 2 to 1 MUX. A number of the plurality of 2 to 1 multiplexers 2 to 1 MUX may be the same as the number of bits included in each of the access code set OPC<0:6> and the encrypted access code set OPC_EN<0:6>. The 2 to 1 multiplexers 2 to 1 MUX may respectively receive corresponding bits of the same sequence within each of the access code set OPC<0:6> and the encrypted access code set OPC_EN<0:6>. When the encryption enable signal ENCEN has a value of '1', the plurality of 2 to 1 multiplexers 2 to 1 MUX may respectively output the corresponding bits of the encrypted access code set OPC_EN<0:6> as the corresponding bits of the modified access code set MOPC<0:6>. When the encryption enable signal ENCEN has a value of '0', the plurality of 2 to 1 multiplexers 2 to 1 MUX may respectively output the corresponding bits of the access code set OPC<0:6> as the corresponding bits of the modified access code set MOPC<0:6>.

Figure 4:
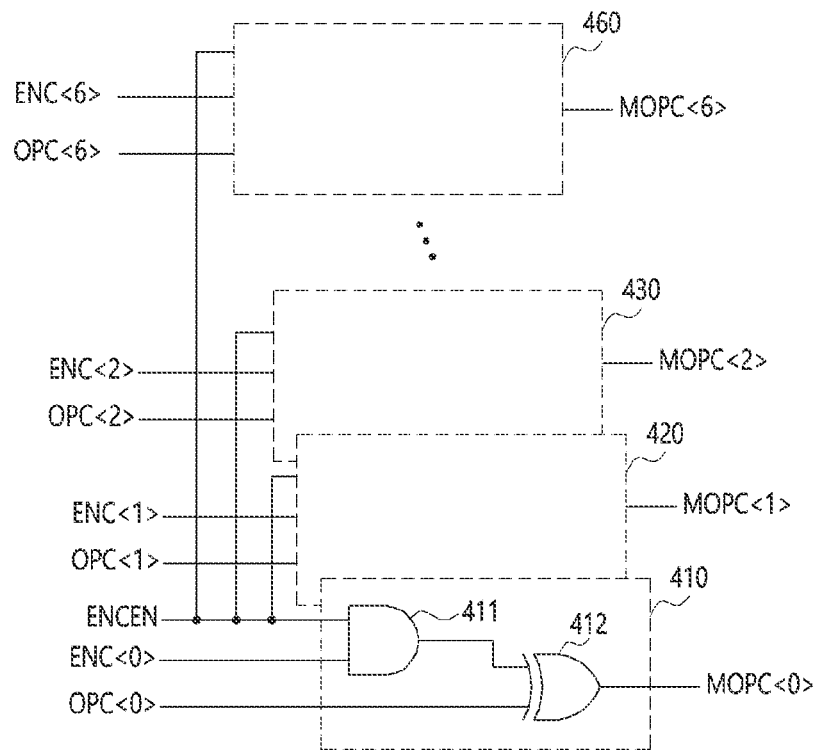
FIG. 4 is a diagram illustrating a configuration of an encrypting circuit in accordance with an embodiment of the present disclosure.

FIG. 4 is a diagram illustrating a configuration of an encrypting circuit 400 in accordance with an embodiment of the present disclosure. The encrypting circuit 400 may be applied as the encrypting circuit 210 illustrated in FIG. 2. Referring to FIG. 4, the encrypting circuit 400 may generate the encrypted access code set by inverting a logic level of each of at least a part of the bits within the access code set OPC<0:6>. The encrypting circuit 400 may include a plurality of gating circuits 410, 420, 430 and 460. A number of the plurality of gating circuits 410, 420, 430 and 460 may be the same as the number of bits included in each of the access code set OPC<0:6> and the modified access code set MOPC<0:6>. Each of the plurality of gating circuits 410, 420, 430 and 460 may receive the encryption enable signal ENCEN, a corresponding one of the bits within the encrypting code ENC<0:6> and a corresponding one of the bits within the access code set OPC<0:6>. Each of the plurality of gating circuits 410, 420, 430 and 460 may output a corresponding one of the bits to be included in the modified access code set MOPC<0:6>. As shown in FIG. 4, the number of bits within the encrypting code ENC<0:6> may be the same as the number of bits within the access code set OPC<0:6>. As a representative example, the first gating circuit 410 may include an AND gate 411 and a XOR gate 412. The AND gate 411 may receive the encryption enable signal ENCEN and the first bit ENC<0> of the encrypting code ENC<0:6>. The XOR gate 412 may receive the output signal from the AND gate 411 and the first bit OPC<0> of the access code set OPC<0:6>.

TABLE 2

| ENCEN | ENC<0> | OPC<0> | MOPC<0> |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

Referring to Table 2, when the encryption enable signal ENCEN becomes disabled to have a value of '0', the output signal from the AND gate 411 may be fixed to have a value of 'O' regardless of the logic level of the first bit ENC<0> of the encrypting code ENC<0:6>. When the output signal from the AND gate 411 becomes fixed to have a value of '0', the XOR gate 412 may output the first bit MOPC<0> of the modified access code set MOPC<0:6>, the first bit MOPC<0> having the same logic level as the first bit OPC<0> of the access code set OPC<0:6>. When the encryption enable signal ENCEN becomes enabled to have a value of '1', the output signal from the AND gate 411 may change depending on the logic level of the first bit ENC<0> of the encrypting code ENC<0:6>. When the first bit ENC<0> of the encrypting code ENC<0:6> has a value of '0', the output signal from the AND gate 411 may have a value of '0' and the XOR gate 412 may output the first bit MOPC<0> of the modified access code set MOPC<0:6>, the first bit MOPC<0> having the same logic level as the first bit OPC<0> of the access code set OPC<0:6>. When the first bit ENC<0> of the encrypting code ENC<0:6> has a value of '1', the output signal from the AND gate 411 may have a value of '0' and the XOR gate 412 may output the first bit MOPC<0> of the modified access code set MOPC<0:6>, the first bit MOPC<0> having the opposite logic level to the first bit OPC<0> of the access code set OPC<0:6>.

Figure 5:
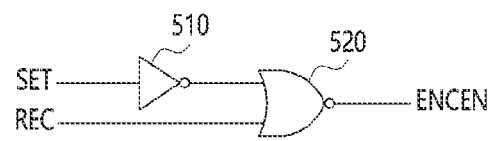
FIG. 5 is a diagram illustrating a configuration of an activating circuit illustrated in FIG. 2 in accordance with an embodiment of the present disclosure.

FIG. 5 is a diagram illustrating a configuration of an activating circuit 240 illustrated in FIG. 2 in accordance with an embodiment of the present disclosure. Referring to FIG. 5, the activating circuit 240 may receive the setting signal SET and the recovery signal REC to generate the encryption enable signal ENCEN. The activating circuit 240 may include an inverter 510 and a NOR gate 520. The inverter 510 may receive the setting signal SET to invertedly drive the setting signal SET. The NOR gate 520 may receive the output signal from the inverter 510 and the recovery signal REC. When the setting signal SET becomes disabled to have a value of '0', the output signal from the inverter 510 may have a value of '1' and the NOR gate 520 may output the encryption enable signal ENCEN, which is disabled to have a value of '0', regardless of whether the recovery signal REC is enabled or not. When the setting signal SET becomes enabled to have a value of '1', the output signal from the inverter 510 may have a value of '0'. The NOR gate 520 may output the encryption enable signal ENCEN, which enabled to have a value of '1', when the recovery signal REC becomes disabled to have a value of '0'. The NOR gate 520 may output the encryption enable signal ENCEN, which is disabled to have a value of '0', when the recovery signal REC becomes enabled to have a value of '1'.

Figure 6:
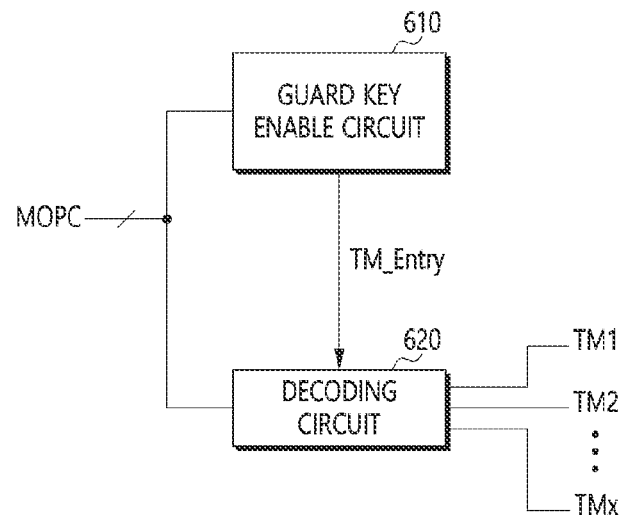
FIG. 6 is a diagram illustrating a configuration of a test mode generating circuit in accordance with an embodiment of the present disclosure.

FIG. 6 is a diagram illustrating a configuration of a test mode generating circuit 600 in accordance with an embodiment of the present disclosure. The test mode generating circuit 600 may be applied as the test mode generating circuit 220 illustrated in FIG. 2, Referring to FIG. 6, the test mode generating circuit 600 may include a guard key enabling circuit 610 and a decoding circuit 620. The guard key enabling circuit 610 may receive the modified access code set MOPC. The guard key enabling circuit 610 may generate a test mode entry signal TM_Entry based on a plurality of modified access code set MOPC. When sequentially receiving the plurality of modified access code sets MOPC having particular logic values, the guard key enabling circuit 610 may enable the test mode entry signal TM_Entry. The guard key enabling circuit 610 may keep the test mode entry signal TM_Entry disabled as long as the modified access code set MOPC does not have the particular logic value or the modified access code sets MOPC having the particular logic values are not sequentially provided.

The decoding circuit 620 may receive the modified access code set MOPC and the test mode entry signal TM_Entry. The decoding circuit 620 may selectively become activated according to the test mode entry signal TM_Entry. When the test mode entry signal TM_Entry becomes enabled, the decoding circuit 620 may become activated to decode the modified access code set MOPC. When the test mode entry signal TM_Entry becomes disabled, the decoding circuit 620 may become deactivated. The decoding circuit 620 may generate one of the plurality of test mode signals TM1, TM2 and TMx by decoding at least one modified access code set MOPC that is provided after the test mode entry signal TM_Entry becomes enabled. For example, when two (2) number of the modified access code sets MOPC respectively having first and second logic values are provided after the test mode entry signal TM_Entry becomes enabled, the decoding circuit 620 may decode the two (2) number of the modified access code sets MOPC to enable the first test mode signal TM1. When four (4) number of the modified access code sets MOPC respectively having third to sixth logic values are provided after the test mode entry signal TM_Entry becomes enabled, the decoding circuit 620 may decode the four (4) number of the modified access code sets MOPC to enable the second test mode signal TM2. When a single modified access code set MOPC having a seventh logic value is provided after the test mode entry signal TM_Entry becomes enabled, the decoding circuit 620 may decode the single modified access code set MOPC to generate the x-th test mode signal TMx. The x-th test mode signal TMx may be provided as the recovery signal REC.

Figure 7:
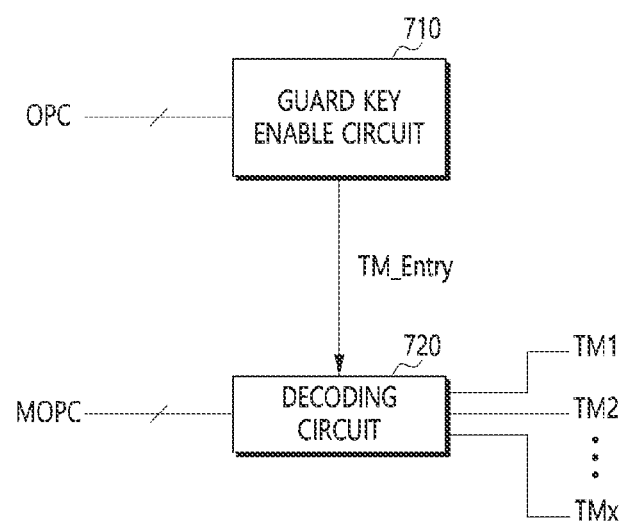
FIG. 7 is a diagram illustrating a configuration of a test mode generating circuit in accordance with an embodiment of the present disclosure.

FIG. 7 is a diagram illustrating a configuration of a test mode generating circuit 700 in accordance with an embodiment of the present disclosure. The test mode generating circuit 700 may be applied as the test mode generating circuit 220 illustrated in FIG. 2. Referring to FIG. 7, the test mode generating circuit 700 may include a guard key enabling circuit 710 and a decoding circuit 720. The guard key enabling circuit 710 may receive the access code set OPC. The guard key enabling circuit 710 of FIG. 7 may receive the access code set OPC while the guard key enabling circuit 610 of FIG. 6 may receive the modified access code set MOPC. The guard key enabling circuit 710 may generate the test mode entry signal TM_Entry based on a plurality of access code sets OPC. When sequentially receiving the plurality of access code sets OPC having particular logic values, the guard key enabling circuit 710 may enable the test mode entry signal TM_Entry. The guard key enabling circuit 710 may keep the test mode entry signal TM_Entry disabled as long as the access code set OPC does not have the particular logic value or the plurality of access code sets OPC having the particular logic values are not sequentially provided. The decoding circuit 720 may receive the modified access code set MOPC and the test mode entry signal TM_Entry to generate the plurality of test mode signals TM1, TM2 and TMx. The decoding circuit 720 may be substantially the same as the decoding circuit 620 of FIG. 6.

Figure 8:
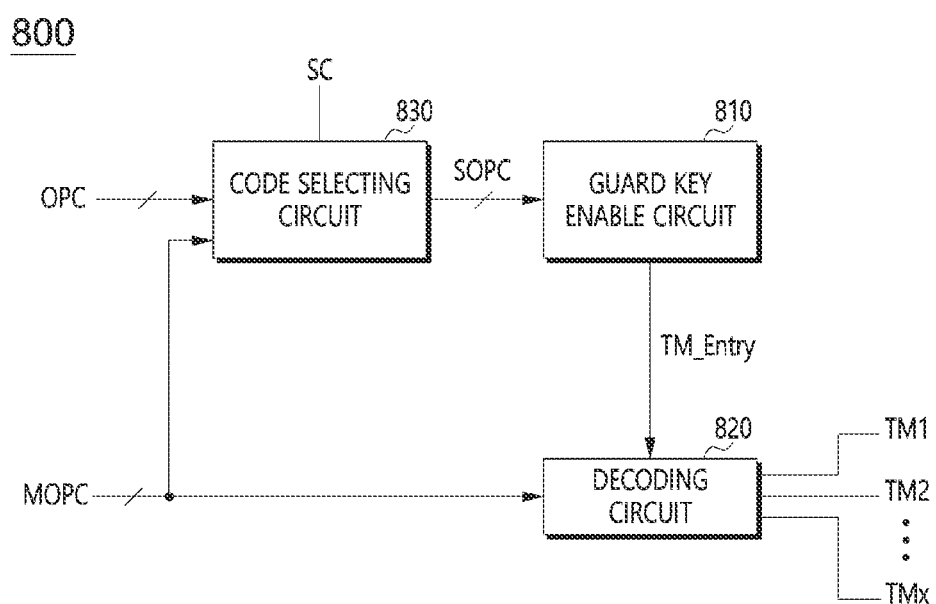
FIG. 8 is a diagram illustrating a configuration of a test mode generating circuit in accordance with an embodiment of the present disclosure.

FIG. 8 is a diagram illustrating a configuration of a test mode generating circuit 800 in accordance with an embodiment of the present disclosure. Referring to FIG. 8, the test mode generating circuit 800 may include a guard key enabling circuit 810, a decoding circuit 820 and a code selecting circuit 830. The code selecting circuit 830 may receive a code selecting signal SC, the access code set OPC and the modified access code set MOPC. The code selecting circuit 830 may output, as a selected access code set SOPC, one of the access code set OPC and the modified access code set MOPC based on the code selecting signal SC. When the code selecting signal SC becomes enabled, the code selecting circuit 830 may output the modified access code set MOPC as the selected access code set SOPC. When the code selecting signal SC becomes disabled, the code selecting circuit 830 may output the access code set OPC as the selected access code set SOPC. For example, the code selecting signal SC may be provided from the non-volatile memory 230 of FIG. 2. A bit corresponding to the code selecting signal SC may be programmed into the non-volatile memory 230. When the semiconductor apparatus 120 of FIG. 1 is booted up or powered up, the non-volatile memory 230 may provide the code selecting signal SC to the test mode generating circuit 800 and/or the code selecting circuit 830.

The guard key enabling circuit 810 may receive the selected access code set SOPC from the code selecting circuit 830. The guard key enabling circuit 810 may generate the test mode entry signal TM_Entry based on the selected access code set SOPC. The guard key enabling circuit 810 may perform substantially the same operation as the guard key enabling circuit 610 of FIG. 6 except that the guard key enabling circuit 810 receives the selected access code set SOPC instead of the modified access code set MOPC. The decoding circuit 820 may receive the modified access code set MOPC and the test mode entry signal TM_Entry to generate the plurality of test mode signals TM1, TM2 and TMx. The decoding circuit 820 may be substantially the same as the decoding circuit 620 of FIG. 6.

Figure 9:
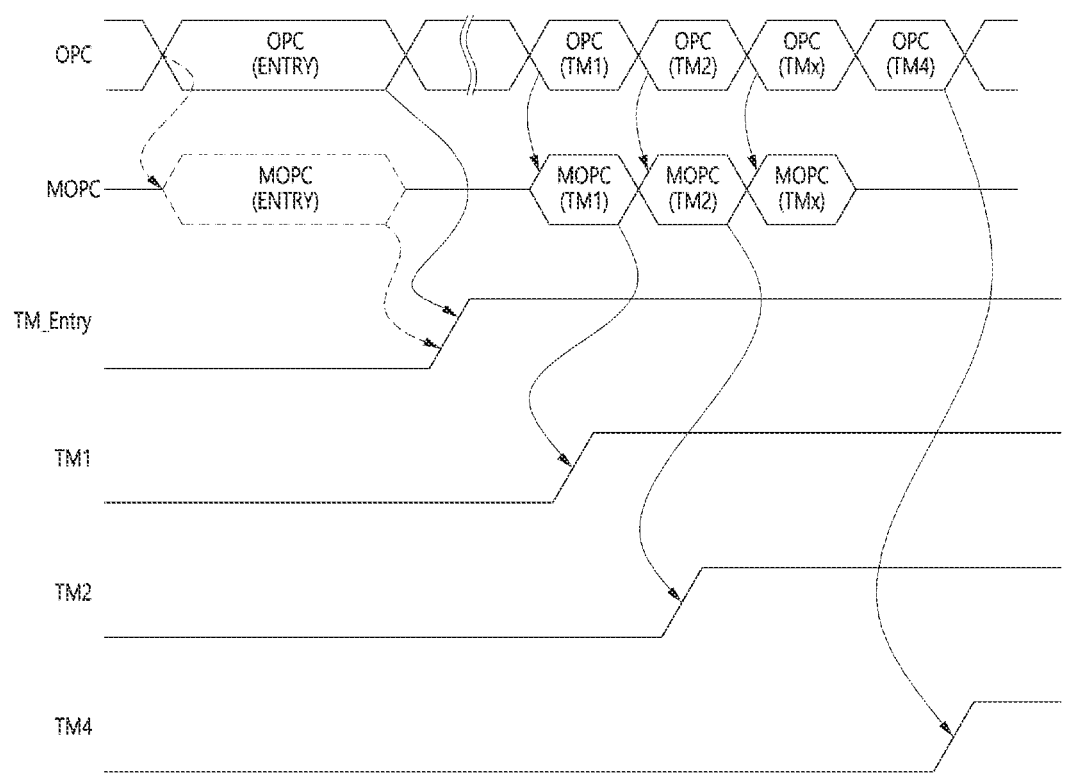
FIG. 9 is a timing diagram illustrating operations of a semiconductor system and a test mode control circuit in accordance with an embodiment of the present disclosure.

FIG. 9 is a timing diagram illustrating operations of a semiconductor system and a test mode control circuit in accordance with an embodiment of the present disclosure. Hereinafter, described with reference to FIGS. 1 to 9 will be the operations of the semiconductor system 100 and the test mode control circuit 200. The external apparatus 110 may provide the control signals CON in order for the semiconductor apparatus 120 to enter a test mode. The interface 121 of the semiconductor apparatus 120 may provide, based on the control signals CON, the test mode control circuit 200 with the access code set OPC (Entry) for the test mode entry. The encrypting circuit 210 may encrypt the access code set OPC (Entry) to generate the modified access code set MOPC (Entry). In response to sequential input of a plurality of access code sets OPC (Entry) having particular logic values, the test mode generating circuit 220 may enable the test mode entry signal TM_Entry. In an embodiment, the test mode generating circuit 220 may be modified to enable the test mode entry signal TM_Entry in response to sequential input of a plurality of modified access code sets MOPC (Entry) having particular logic values, After the test mode entry signal TM_Entry becomes enabled and the semiconductor apparatus 120 enters the test mode, the external apparatus 110 may provide the semiconductor apparatus 120 with the control signals CON for generating a test mode signal. When an access code set OPC (TM1) is generated from the control signals CON for generating a first test mode signal TM1, the encrypting circuit 210 may encrypt the access code set OPC (TM1) to generate the modified access code set MOPC (TM1). Based on the modified access code set MOPC (TM1), the test mode generating circuit 220 may enable the first test mode signal TM1. The internal circuit 124 may perform a first test operation in response to the first test mode signal TM1. When an access code set OPC (TM2) is generated from the control signals CON for generating a second test mode signal TM2, the encrypting circuit 210 may encrypt the access code set OPC (TM2) to generate the modified access code set MOPC (TM2). Based on the modified access code set MOPC (TM2), the test mode generating circuit 220 may enable the second test mode signal TM2. The internal circuit 125 may perform a second test operation in response to the second test mode signal TM2.

After that, in order to stop the encrypting operation of the semiconductor apparatus 120, the external apparatus 110 may provide the semiconductor apparatus 120 with the control signals CON for generating the x-th test mode signal TMx. The encrypting circuit 210 may encrypt the access code set OPC (TMx), which is generated on the basis of the control signals CON, to generate the modified access code set MOPC (TMx). Based on the modified access code set MOPC (TMx), the test mode generating circuit 220 may enable the x-th test mode signal TMx. When the x-th test mode signal TMx becomes enabled, the encrypting circuit 210 may not encrypt the access code set OPC but may provide the access code set OPC as the modified access code set MOPC. When the external apparatus 110 provides the control signals CON for generating a fourth test mode signal TM4, the encrypting circuit 210 may not encrypt the access code set OPC (TM4), which is generated on the basis of the control signals CON. Therefore, the test mode generating circuit 220 may enable the fourth test mode signal TM4 based on the access code set OPC (TM4).

While certain embodiments have been described above, it will be understood to those skilled in the art that the embodiments described are by way of example only. Accordingly, the test mode control circuit and the semiconductor apparatus and the semiconductor system including the same should not be limited based on the described embodiments. Rather, the test mode control circuit and the semiconductor apparatus and the semiconductor system including the same described herein should only be limited in light of the claims that follow when taken in conjunction with the above description and accompanying drawings. Furthermore, the embodiments may be combined to form additional embodiments.

What is claimed is:

1. A test mode control circuit comprising:
    a non-volatile memory configured to store an encrypting code;
    an encrypting circuit configured to:
        receive the encrypting code from the non-volatile memory, and change, based on the encrypting code, a logic level of each of at least a part of bits included in an access code set to generate a modified access code set when an encryption function is activated; and a test mode generating circuit configured to generate a plurality of test mode signals based on the modified access code set.

2. The test mode control circuit of claim 1, wherein the encrypting circuit is configured to:
change, based on the encrypting code, a sequence of the bits included in the access code set to generate an encrypted access code set, and
provide the encrypted access code set as the modified access code set.

3. The test mode control circuit of claim 1, wherein the encrypting circuit changes the logic level by performing logic operations on respective bits included in the encrypting code and the respective bits included in the access code set to provide the encrypted access code set as the modified access code set.

4. The test mode control circuit of claim 1, wherein the test mode generating circuit includes:
a guard key enabling circuit configured to enable a test mode entry signal when receiving a plurality of modified access code sets having particular logic values; and
a decoding circuit configured to generate at least one of the plurality of test mode signals based on the modified access code set provided once or more after the test mode entry signal is enabled.

5. The test mode control circuit of claim 1, wherein the test mode generating circuit includes:
a guard key enabling circuit configured to enable a test mode entry signal when receiving a plurality of access code sets having particular logic values; and
a decoding circuit configured to generate at least one of the plurality of test mode signals based on the modified access code set provided once or more after the test mode entry signal is enabled.

6. The test mode control circuit of claim 1,
wherein the test mode generating circuit is further configured to receive the access code set, and
wherein the test mode generating circuit includes:
a code selecting circuit configured to output, as a selected code set, one of the access code set and the modified access code set based on a code selecting signal;
a guard key enabling circuit configured to enable a test mode entry signal when receiving a plurality of selected code sets having particular logic values from the code selecting circuit; and
a decoding circuit configured to generate at least one of the plurality of test mode signals based on the modified access code set provided once or more after the test mode entry signal is enabled.

7. The test mode control circuit of claim 1,
wherein the encrypting circuit is further configured to receive an encryption enable signal, and
wherein the encryption function of the encrypting circuit is activated when the encryption enable signal is enabled, and the encryption circuit is configured to provide the access code set as the modified access code set when the encryption enable signal is disabled.

8. The test mode control circuit of claim 7,
further comprising an activating circuit configured to enable the encryption enable signal based on a setting signal and configured to disable the encryption enable signal based on a recovery signal, and wherein the setting signal is provided from the non-volatile memory.

9. The test mode control circuit of claim 8, wherein the recovery signal is at least one of the plurality of test mode signals.

10. A semiconductor system comprising:
an external apparatus configured to provide a control signal corresponding to a decrypted access code set; and
a semiconductor apparatus configured to generate a plurality of test mode signals based on the decrypted access code set,
wherein the semiconductor apparatus includes:
an encrypting circuit configured to encrypt the decrypted access code set to generate an encrypted access code set; and
a test mode generating circuit configured to generate the plurality of test mode signals based on the encrypted access code set.

11. The semiconductor system of claim 10, wherein the encrypting circuit is configured to:
receive an encrypting code, and
change, based on the encrypting code, a logic level of each of at least a part of bits included in the decrypted access code set to generate the encrypted access code set.

12. The semiconductor system of claim 11, wherein the semiconductor apparatus further includes a non-volatile memory configured to provide the encrypting code to the encrypting circuit.

13. The semiconductor system of claim 10, wherein the test mode generating circuit includes:
a guard key enabling circuit configured to enable a test mode entry signal when receiving a plurality of encrypted access code sets having particular logic values; and
a decoding circuit configured to generate at least one of the plurality of test mode signals based on the encrypted access code set provided once or more after the test mode entry signal is enabled.

14. The semiconductor system of claim 10,
wherein the test mode generating circuit is further configured to receive the decrypted access code set, and
wherein the test mode generating circuit includes:
a code selecting circuit configured to output, as a selected code set, one of the decrypted access code set and the encrypted access code set based on a code selecting signal;
a guard key enabling circuit configured to enable a test mode entry signal when receiving a plurality of selected code sets having particular logic values from the code selecting circuit; and
a decoding circuit configured to generate at least one of the plurality of test mode signals based on the encrypted access code set provided once or more after the test mode entry signal is enabled.

15. The semiconductor system of claim 10, wherein the encrypting circuit encrypts the decrypted access code set selectively based on a setting signal, which is provided from a non-volatile memory, and at least one of the plurality of test mode signals.

16. An operating method of a semiconductor system, the operating method comprising:
providing, by an external apparatus, a control signal corresponding to an access code set for test mode entry;
entering, by a semiconductor apparatus, a test mode based on the access code set for the test mode entry;

providing, by the external apparatus, a control signal corresponding to an access code set for generating a test mode signal;

generating, by the semiconductor apparatus, an encrypted access code set by encrypting the access code set for generating the test mode signal; and generating, by the semiconductor apparatus, at least one of a plurality of test mode signals based on the encrypted access code set.

17. The operating method of claim 16, wherein the entering of the test mode includes:

encrypting the access code set for the test mode entry; and enabling a test mode entry signal based on the encrypted access code set.

18. The operating method of claim 16, wherein the encrypted access code set for generating the test mode signal is generated by changing, based on an encrypting code, a logic level of each of at least a part of bits included in the access code set for generating the test mode signal.

19. The operating method of claim 16, wherein the semiconductor apparatus is configured not to encrypt the access code set based on one of the plurality of test mode signals and configured to generate at least another one of the plurality of test mode signals based on the access code set.

* * * * *